Figure 4:
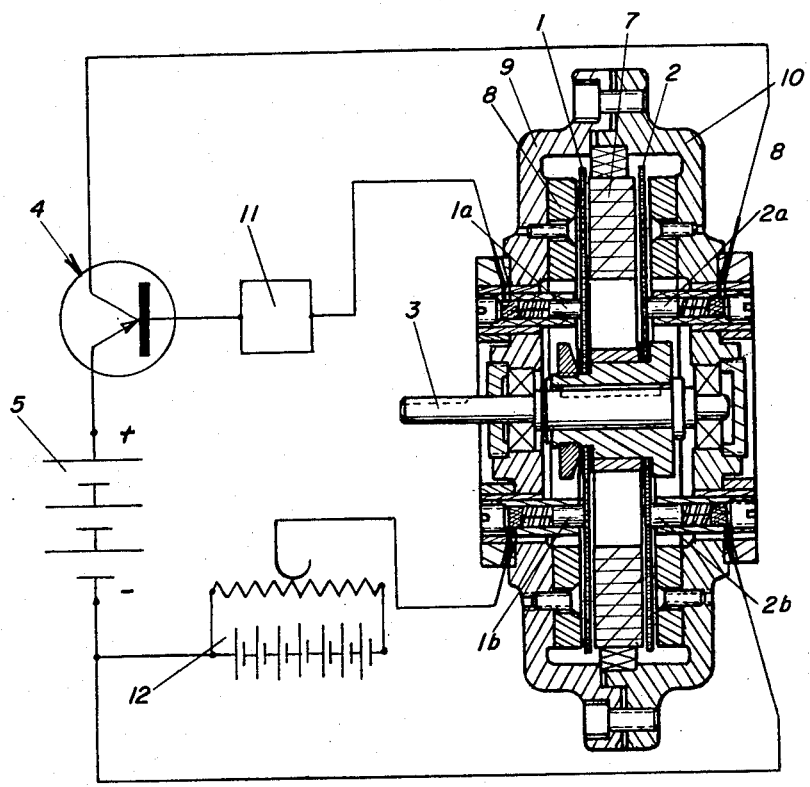

March 2, 1965     R. DECHET     3,172,028
SELF-REGULATING ROTARY ELECTRIC MACHINES
Filed Jan. 9, 1961     2 Sheets-Sheet 1
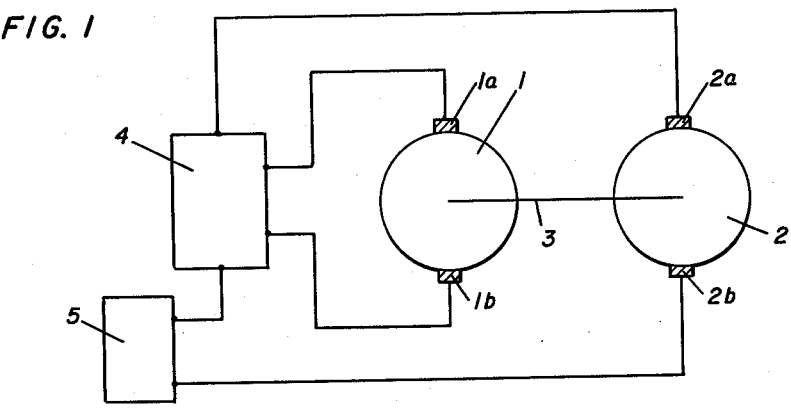
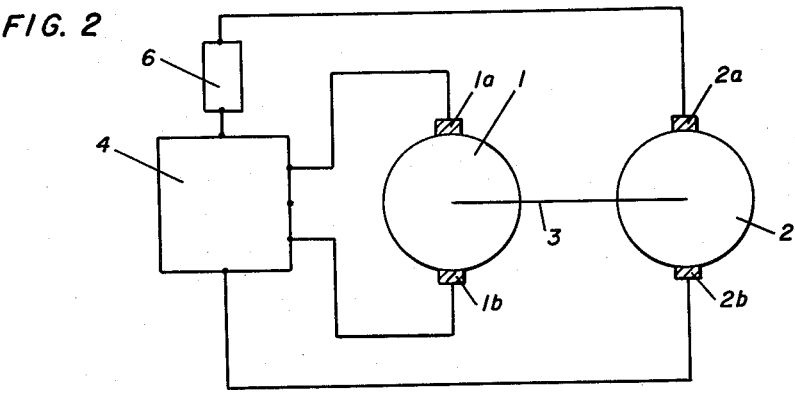
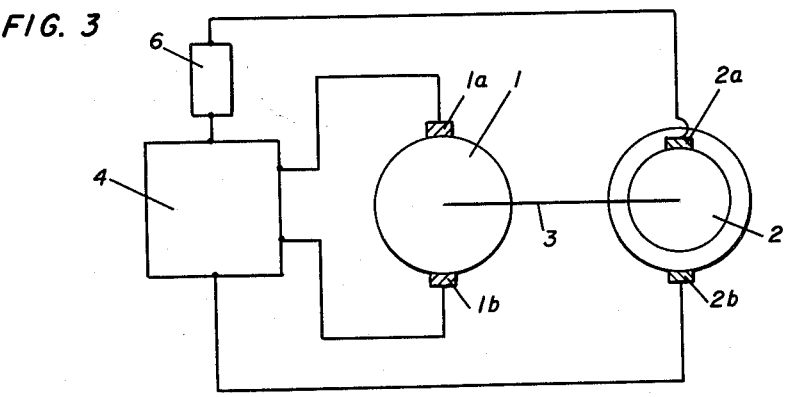
INVENTOR:
ROBERT DECHET
BY *Robert Henderson*
ATTORNEY March 2, 1965  R. DECHET  3,172,028
SELF-REGULATING ROTARY ELECTRIC MACHINES
Filed Jan. 9, 1961  2 Sheets-Sheet 2

Inventor:
Robert Dechet
by Robert Henderson
attorney

United States Patent Office 3,172,028
Patented Mar. 2, 1965

3,172,028
SELF-REGULATING ROTARY ELECTRIC MACHINES
Robert Dechet, Boulogne-sur-Seine, France, assignor to Compagnie Electro Mecanique, Paris, France, a corporation of France
Filed Jan. 9, 1961, Ser. No. 81,594
Claims priority, application France, Jan. 11, 1960, 815,325
4 Claims. (Cl. 318—327)

The present invention relates to rotary electric machines having flat or planar air gaps, wherein the armature is constituted by a multiplicity of thin discs carrying laminated-conductor-type flat windings.

One advantage in a machine of this type is that its armature reaction does not distort the magnetic field generated by the field magnet.

A further advantage, when the conductors are at least partly bare, is that they can be made to perform the function of commutator blades, thereby permitting very fine adjustments. Still another advantage is that improved axial compactness is obtained.

The present invention takes advantage of these properties with the object of producing self-regulating rotary electric machines of the aforementioned type.

Such a machine is characterized, in accordance with the present invention, by the combination of one at least of these flat laminated-conductor-type windings with an element of variable electrical conductance with a view of influencing that conductance, the said element being associated to some other portion of the machine so chosen that the variations in the conductance of the element lead to the required regulation of the machine.

The description which follows with reference to the accompanying drawings, given by way of example only and not in a limiting sense, will give a clear understanding of how the invention may be utilized.

In these drawings, FIGURES 1, 2 and 3 are diagrammatic illustrations of the application of this invention to a D.C. motor, a D.C. generator and a single-phase A.C. generator, respectively.

FIGURE 4 is an axial sectional view of a D.C. motor in an arrangement according to FIGURE 1.

In all cases, the machines are assumed to be of the flat air gap type. In FIGURES 1 through 3, the field magnets are not shown. The armature in each case consists of at least two discs 1 and 2 keyed to a common shaft 3 and each disc carries a flat winding formed from laminated conductors.

Disc 1 is so associated with a field magnet that, between the brushes 1a and 1b, a D.C. voltage is collected which is proportional to the rotational speed of shaft 3.

In the case of the D.C. motor shown in FIGURE 1, disc 2, which carries the armature winding, is fed from a D.C. source 5 through a variable conductance element 4, say a transistor.

Thus in order to ensure constant speed operation of this motor, the following procedure is adopted: the rotational speed of the motor is detected by tapping off the laminated-conductor-type flat winding of disc 1 a signal that is a function of that speed—in this case the voltage generated by the winding—and this signal is applied to the element 4, say to the circuit connected to the base and emitter of the transistor, in order to determine thereat an electrical conductance of corresponding degree, the said element being furthermore connected so that its conductance in turn regulates the rotational speed of the motor.

This being so, it will be appreciated that any accidental change in the speed of the motor will be reflected by a corresponding change in the conductance of regulating element 4 and that this will in turn provoke control action over the motor tending to provoke a further change in speed to compensate for the initial disturbance.

In the case of the D.C. generator shown in FIGURE 2, the variable conductance element 4 is series-connected to a load circuit 6 and to the armature winding carried by the disc 2, through the medium of brushes 2a, 2b rubbing against a bare part of the laminated conductors themselves. If the said element is a transistor, the voltage across brushes 1a and 1b can be injected into the base-emitter circuit of the transistor. In this way, the generator output can be regulated when the rotational speed of its shaft 3 fluctuates.

FIGURE 3 refers to a single-phase A.C. generator in which the disc 2 carries the A.C. armature winding. Brushes 2a, 2b rub against concentric circular tracks suitably connected to this winding. As before, the armature feeds into a load circuit 6 via a variable conductance element 4. The latter may be a magnetic amplifier whose magnetic saturation is subjected to the influence of the voltage across brushes 1a and 1b, the A.C. circuit being placed in series with load circuit 6 and armature 2.

The three wiring layouts described hereinabove have been restricted to the vital component elements required for an understanding of how a self-regulating machine can be obtained in accordance with the invention. In practice it would be necessary to add the various component elements required for the regulation function proper, such as stabilizing filters, reference voltage sources and possibly amplifiers, etc. By way of example, FIGURE 4 illustrates a simple layout in accordance with FIGURE 1, for the case of a D.C. motor with self-regulated speed, the variable conductance element 4 being a junction transistor.

The armature of this motor comprises the two discs 1 and 2 already mentioned, mounted on the shaft 3 through the medium of an insulating bush. The field magnet consists of a single ferrite ring 7 disposed between the two discs. A double magnetic ring 8 is provided for flux return, facing the discs 1 and 2 but at the sides thereof opposite to the interposed ring 7. Rings 7 and 8 are mounted in a frame comprising two sections 9 and 10, and in this frame are accommodated brushes 1a, 1b, 2a and 2b.

The winding on disc 2, which is the main winding, is fed from source 5 via transistor 4 whose emitter is connected to the source's positive pole. The base-emitter circuit of said transistor comprises, in series, a stabilizing filter 11, an adjutable-voltage D.C. source 12 and the winding of disc 1, which is an auxiliary winding. The source 12, which is placed in opposition to the voltage across brushes 1a and 1b, provides the reference value of the selected rotational speed.

It is to be clearly understood that many modifications can be made to the form of execution of such a D.C. motor. By way of example, the motor may incorporate an armature-reaction compensating winding, or a field magnet for the disc 1 and one or more field magnets for the disc or discs 2; furthermore, the disc 1 may be bonded to the disc 2 or to one of the discs 2, with interposed insulating means.

What is claimed is:

1. A self-regulating electric device comprising, in combination, a rotary electric machine of the planar air-gap type having a first rotary disc carrying a main flat, laminated-conductor winding and a second rotary disc means mounting said discs for joint rotation, carrying an auxiliary flat, laminated-conductor winding, said auxiliary winding being adapted to generate a voltage which depends on the rotational speed of the machine, and electrical conductance means, variable, conductively, in accordacne with variations of voltage applied thereto, said electrical conductance means being connected in series with said main winding, and said auxiliary winding being so connected with said electrical conductance means as to apply, to the latter, the voltage generated by said auxiliary winding.

2. A combination according to claim 1, wherein said machine is a D.C. machine and said electrical conductance means comprises a transistor whose base-emitter circuit voltage is supplied by said auxiliary winding and whose emitter-collector circuit is connected in series with said main winding.

3. A combination according to claim 1, wherein said machine comprises a casing and a magnetic field system carried thereby, said discs being rigidly connected with one another for joint rotation, and both said discs being located within said casing and extending across the magnetic flux of said magnetic field system.

4. A combination according to claim 3, wherein said magnetic field system is so designed as to define two axially spaced planar air gaps within said casing, said disc being mounted for rotation within said air gaps, respectively.

References Cited by the Examiner
UNITED STATES PATENTS

| | | | |
|---|---|---|---|
| 2,777,106 | 1/57 | Brown | 318—331 |
| 2,850,654 | 9/58 | Jaeschke | 310—94 |
| 2,975,349 | 3/61 | Green | 318—331 |

FOREIGN PATENTS 525,895  12/53  Italy.

MILTON O. HIRSHFIELD, *Primary Examiner.*

ORIS L. RADER, *Examiner.*